United States Patent Office 3,539,525
Patented Nov. 10, 1970

3,539,525
SEALANT COMPOSITION FROM ETHYLENE-PROPYLENE-DIENE TERPOLYMER
Victor V. Raimondi, Naperville, Ill., assignor to Standard Oil Company, Chicago, Ill., a corporation of Indiana
No Drawing. Filed Nov. 21, 1967, Ser. No. 684,639
Int. Cl. C08c 11/22; C08f 45/28
U.S. Cl. 260—33.6
4 Claims

ABSTRACT OF THE DISCLOSURE

Weather-resistant sealant compositions are prepared from an ethylene-propylene-diene terpolymer as primary binder, viscous polypropylene as plasticizer, and an adhesion promoter. The sealants may also contain usual fillers, accelerators, release agents and vulcanizing agents known to the art.

---

Sealants which can be applied in the form of cured tape to produce a durable adhesive seal between glass and metal surfaces have wide application in the automotive industry in the installation of windshields and rear windows. The tapes used for such applications are often deficient in ozone and weather resistance properties though it is desirable that a tape for automotive use have great stability to weather and ozone exposure.

Ethylene-propylene-diene terpolymers, that is polymers of ethylene and propylene with various non-conjugated dienes, provide a class of synthetic rubbers which have weather, ozone and chemical resistance of a high degree, which can be extended with oils and fillers with relatively little sacrifice in vulcanizing properties and which can be vulcanized with conventional sulfur systems. Unfortunately, some of the properties which make these rubbers so stable are also responsible for making it difficult to prepare formulations which can be substituted into applications now served by natural rubber and synthetic rubbers of the GRS and butyl types.

I have found a way to prepare a cured tape from an ethylene-propylene-diene terpolymer using specific plasticizer and adhesion promoters, with ordinary vulcanizing agents and the optional addition of fillers, accelerators, release agents, and like additives known to the art.

The ethylene-propylene-diene terpolymers useful in the practice of my invention are any of those having rubber-like properties. These terpolymers are made by polymerization of a mixture of ethylene, propylene and a non-conjugated diene, such as dicyclopentadiene, 1,4-hexadiene, 2-methylnorbornene and 11-ethyl-1,11-tridecadiene. The optimum content of the non-conjugated diene to the total polymer is generally within the range of 0.1 to 1.0 mole per kilogram, depending on the diene used. A common ratio of component molecules is sixteen ethylene units to eight propylene units to each diene unit, but these can be varied within the skill of the art to effect variations in the resulting terpolymer properties. The primary function of the diene appears to be to provide cross-linking for vulcanization. The selection of a suitable terpolymer for use in the practice of my invention is within the skill of workers in this art.

The primary plasticizer for use in my sealant composition with the ethylene-propylene-diene terpolymers is desirably a viscous polypropylene having a kinematic viscosity within the range of about 2115 cs. @ 100° F. to about 15,950 cs. @ 100° F. The viscous polypropylenes provide tack and adhesion properties better than those obtainable with some other commonly-used plasticizers, such as polybutenes and process oils.

The adhesion promoter to be used in preparing the compositions of my invention should be selected from the group of pentaerythritol esters of hydrogenated rosins, and poly-alpha-methylstyrene resins, of which a commercially available example is Amoco Resin 18–210. The adhesion promoters preferably have ring and ball softening points in the range 200° F. to 220° F. and specific gravities at 60°/60° F. within the range 1.04 to 1.08 g./cc.

The amounts of plasticizer and adhesion promoter to be used in conjunction with 100 parts of the synthetic terpolymer rubber are preferably within the range of about 50 to about 150 parts of plasticizer and about 5 to about 100 parts of adhesion promoter, depending upon the properties desired in the final cured rubber. Best results are obtained when about 100 parts of plasticizer and from 20 to 50 parts of adhesion promoter are used for every 100 parts of the synthetic terpolymer rubber. The usual fillers, accelerators, release agents, vulcanizing agents and other additives for synthetic rubbers can be added in amounts to produce usual effects upon the final product properties in accordance with techniques known to those skilled in the art.

The preparation of some sealant formulations in accordance with my invention is described in the examples set forth hereinbelow. The general formulations procedure involved a first step of banding the ethylene-propylene-diene terpolymer on a tight mill for about 10 minutes at a milling temperature of 180 to 200° F. Then there was added a viscous polypropylene containing a slurry of carbon black in the amounts shown in the examples and in small increments. The zinc oxide and stearic acid were next added and dispersed while milling for 5 to 10 more minutes. The adhesion promoter was then added and when the operator recognized the necessity for raising the temperature, the mill temperature was increased to 220 to 250° F. to facilitate dispersion of the additives. The accelerators were next added over 5 minutes milling time, following which sulfur was added and the mix milled for an additional 5 minutes. The prepared stock was then sheeted from the mill and vulcanized in a preheated 6" x ½" x ½" cavity mold at 300° F. for about 12 minutes. The cured samples were allowed to rest at least 24 hours before being tested.

EXAMPLE 1

To 300 parts of an ethylene-propylene-diene terpolymer (Nordel 1040 methylene, propylene, 1,4-hexadiene terpolymer), there was added 300 parts of viscous polypropylene (Amopol C-175), 60 parts of carbon black, 60 parts of the pentaerythritol ester of hydrogenated rosin, 15 parts of zinc oxide, 3 parts of stearic acid, 2 parts of tetraethylthiuram disulfide, 1 part of mercaptobenzothiazole and 1.5 parts of sulfur. The milled mixture, prepared as described in the general formulation technique set forth hereinabove, was vulcanized and a sample of the vulcanizate was evaluated as a sealant in accordance with commercial tests for butyl bonding tapes. The results of the tests of the product of this example are presented in the table hereinbelow and compared to commercial requirements for butyl bonding tapes.

EXAMPLE 2

To 300 parts of an ethylene-propylene-diene terpolymer (Nordel 1940), there was added 300 parts of viscous polypropylene (Amopol C-175), 60 parts of carbon black, 60 parts of poly-alpha-methylstyrene (Amoco Resin 18-210), 15 parts of zinc oxide, 3 parts of stearic acid, 2 parts of tetraethylthiuram disulfide, 1 part of mercaptobenzothiazole and 1.5 parts of sulfur. The milled mixture, prepared as described in the general formulation technique set forth hereinabove, was vulcanized and a sample of the vulcanizate was evaluated as a sealant in accordance with commercial tests for butyl bonding tapes.

The results of the tests of the product of this example are presented in the table hereinbelow and compared to the requirements for butyl bonding tapes.

EXAMPLE 3

To 300 parts of an ethylene-propylene-diene terpolymer (Nordel 1040), there was added 300 parts of viscous polypropylene (Amopol C–175), 60 parts of carbon black, 60 parts of the pentaerythritol ester of hydrogenated rosin, 15 parts of zinc oxide, 3 parts of stearic acid, 2 parts of tetraethylthiuram disulfide, 1 part of mercaptobenzothiazole and 1.5 parts of sulfur. The milled mixture, prepared as described in the general formulation technique set forth hereinabove, was vulcanized and a sample of the vulcanizate was evaluated as a sealant in accordance with commercial tests for butyl bonding tapes. The results of the tests of the product of this example are presented in the table hereinbelow and compared to the requirements for butyl bonding tapes.

TABLE.—EVALUATION OF ETHYLENE-PROPYLENE-DIENE TERPOLYMER SEALANTS AND COMPARISON TO SPECIFICATION TESTS FOR BUTYL BONDING TAPES

| Tests | Formulation ||| Requirements |
|---|---|---|---|---|
| | Ex. 1 | Ex. 2 | Ex. 3 | |
| Normal yield strength, lbs./sq. in. | 14.5 | 20.7 | 14.6 | 12 |
| Cohesive fail, percent | ¹ 90 | ¹ 70 | ¹ 95 | 100 |
| Shore A durometer hardness at 74±5° F. | 15 | 13 | 14.5 | 20±5 |
| Shore A durometer hardness after aging 2 weeks at 190° F. | 13 | 16 | 19 | 20±5 |
| Heat sag | (²) | | (³) | (⁴) |
| Heat resistance | (³) | (³) | (³) | (⁵) |
| Staining | (³) | (³) | (³) | (⁶) |
| Paint compatibility: | | | | |
| (a) Migration stain | (³) | (³) | (³) | (⁷) |
| (b) Pinholing | (³) | (³) | (³) | (⁷) |
| (c) Blistering | (³) | (³) | (³) | (⁷) |
| (d) Softening of film | (³) | (³) | (³) | (⁷) |
| Low temp. flex | (³) | (³) | (³) | (⁸) |

¹ Approximate.
² Marginal fail.
³ Pass.
⁴ No more than 1/16 inch sag.
⁵ No evidence of plasticizer migration, flow, blistering or loss of adhesion.
⁶ No evidence of migration stain.
⁷ No evidence of migration stain, pinholing, blistering or softening of paint coating.
⁸ No cracking exhibited by the tape sealant.

From the above results it can be appreciated that my novel compositions provide useful sealant tapes which can be applied to the sealing of glass to metal surfaces. Although some of the properties of my novel tapes are not the same as present commercial requirements for butyl tapes, the ozone resistance and weather stability of my tapes makes them quite suitable for sealant purposes and more desirable in ozone and weather exposed conditions of use.

Having thus described my invention, what I claim is:

1. A sealant composition comprising 100 parts of an ethylene-propylene-non-conjugated diene terpolymer rubber with an amount within the range of about 50 parts to about 150 parts of viscous polypropylene and an amount within the range of about 5 parts and about 100 parts of a liquid polymer of poly-alpha-methylstyrene as an adhesion promoter.

2. The composition of claim 1 wherein the amount of viscous polypropylene is about 100 parts and the amount of adhesion promoter is within the range of about 20 to about 50 parts.

3. The composition of claim 2 wherein said terpolymer is an ethylene-propylene-1,4-hexadiene terpolymer.

4. The composition of claim 2 wherein said terpolymer consists essentially of ethylene, propylene and non-conjugated diene units in the ratio of about 16:8:1.

References Cited

UNITED STATES PATENTS

| | | | |
|---|---|---|---|
| 2,700,026 | 1/1955 | Dibert | 260—88.2 |
| 3,262,482 | 7/1966 | Clifton et al. | 260—80.7 |
| 3,311,151 | 3/1967 | Willis et al. | 260—80.7 |
| 3,331,804 | 7/1967 | Fogiel | 260—27 |
| 3,402,140 | 9/1968 | Bickel et al. | 260—24 |

OTHER REFERENCES

Hercules Powder Co., "Pentalynond Pentalyn G," December 1943, p. 5 relied on.

DONALD E. CZAJA, Primary Examiner

W. E. PARKER, Assistant Examiner

U.S. Cl. X.R.

260—27, 897